United States Patent
Deleuze et al.

(10) Patent No.: US 9,290,633 B2
(45) Date of Patent: Mar. 22, 2016

(54) INTERCONNECTED MICROCELLULAR MATERIAL MADE OF INDUSTRIAL LIGNIN AND METHOD FOR PREPARING SAME

(71) Applicants: UNIVERSITE DE BORDEAUX, Bordeaux (FR); CENTRE NATIONAL DE LA RECHERCHE SCIENTIFIQUE (CNRS), Paris (FR)

(72) Inventors: Herve Deleuze, Saint Magne (FR); Claire Forgacz, Tournefeuille (FR); Marc Birot, Talence (FR)

(73) Assignees: UNIVERSITE DE BORDEAUX, Bordeaux (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 90 days.

(21) Appl. No.: 14/346,426

(22) PCT Filed: Sep. 27, 2012

(86) PCT No.: PCT/FR2012/052188
§ 371 (c)(1),
(2) Date: Mar. 21, 2014

(87) PCT Pub. No.: WO2013/045848
PCT Pub. Date: Apr. 4, 2013

(65) Prior Publication Data
US 2014/0228460 A1 Aug. 14, 2014

(30) Foreign Application Priority Data

Sep. 29, 2011 (FR) .................................... 11 58752

(51) Int. Cl.
*C08J 9/228* (2006.01)
*C08J 9/28* (2006.01)

(52) U.S. Cl.
CPC .. *C08J 9/228* (2013.01); *C08J 9/28* (2013.01); *C08J 2397/00* (2013.01)

(58) Field of Classification Search
CPC ........... C08J 9/228; C08J 9/28; C08J 2397/00
See application file for complete search history.

(56) References Cited

U.S. PATENT DOCUMENTS 3,857,830 A * 12/1974 Briggs .......................... 527/401
4,168,371 A 9/1979 Brown

OTHER PUBLICATIONS

International Search Report, dated Feb. 17, 2014, from corresponding PCT application.

* cited by examiner

*Primary Examiner* — Irina S Zemel
(74) *Attorney, Agent, or Firm* — Young & Thompson

(57) ABSTRACT

An interconnected microcellular material, a method for preparing said material using low-value waste from the paper industry, such as industrial lignin, and the use thereof for the production of items such as catalysts, filters or absorbent elements.

23 Claims, 1 Drawing Sheet

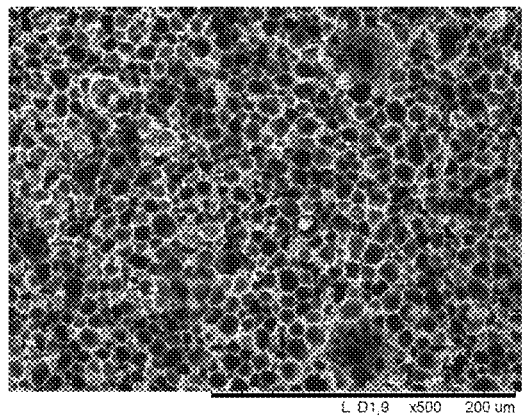
Figure 1: interconnected microcellular material A
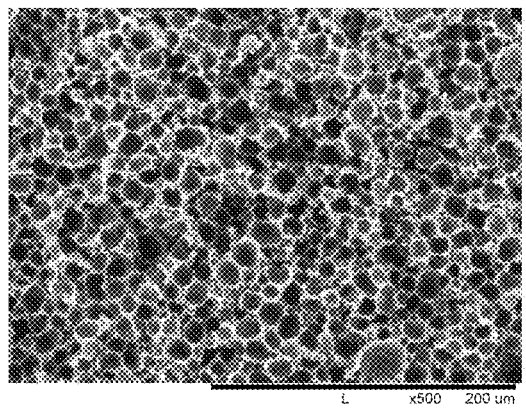
Figure 2: interconnected microcellular material C

INTERCONNECTED MICROCELLULAR MATERIAL MADE OF INDUSTRIAL LIGNIN AND METHOD FOR PREPARING SAME

FIELD OF THE INVENTION

The invention relates to a microcellular material, a method for the preparation of this material from low-value waste from the paper industry, as well as its use for the manufacture of articles such as catalysts, filters or absorbent elements.

BACKGROUND OF THE INVENTION

The microcellular materials according to the invention are porous monoliths of centimetric size, the porosity of which is characterized by the presence of spherical cavities also called "cells", which have a diameter situated generally between 1 and 100 µm, in particular from approximately 2 µm to approximately 50 µm, and preferably from approximately 5 µm to approximately 20 µm. These cells are generally all interconnected with their close neighbours by apertures or "windows" of a smaller size than their own size. These interconnecting windows have variable dimensions and have a diameter from approximately 0.5 to approximately 10 µm in particular from approximately 50 nm to approximately 1000 nm, and preferably from approximately 250 nm to approximately 500 nm.

The interconnected microcellular materials according to the invention have a particularly low density of 0.02 to 0.2 g·cm$^{-3}$.

The existing interconnected microcellular materials are generally obtained by the polyHIPE (Polymerization of a High Internal Phase Emulsion) method. Such materials are, for example, described in patent application FR 2 932 184.

The polyHIPE method consists of the polymerization of a highly concentrated emulsion which is composed of an internal dispersed phase the volume percent of which is greater than that of the external dispersion phase. The volume percent of the internal dispersed phase must theoretically be greater than or equal to 74% with respect to the total volume of the emulsion. This threshold of 74% corresponds to the maximum volume occupied by uniform spherical drops of the internal dispersed phase and arranged so that they do not undergo deformation. Beyond 74%, the drops are compressed against each other. In the case of an emulsion exhibiting a wide drop size distribution (namely a polydisperse emulsion), the threshold for obtaining, after polymerization, an interconnected porous structure can be less than the theoretical value of 74%.

The external dispersion phase of the polyHIPE method constitutes the continuous phase and comprises mainly monomers capable of polymerizing as well as a surfactant in solution in a solvent. The internal dispersed phase is mainly constituted by a solvent that is immiscible with the monomers and/or with the solvent of the continuous phase.

After polymerization and elimination of the solvent from the internal dispersed phase, interconnected microcellular materials are obtained.

In view of their structure and their physical properties, interconnected microcellular materials are the subject of increasing interest and their use has been proposed in many fields, among which are the manufacture of disposable absorbent articles, thermal, acoustic, electrical or mechanical insulation articles, membranes, filters or also supports for inks, colorants and catalysts.

However, the interconnected microcellular materials described to date are obtained from polymerizable precursors mainly of petroleum origin or of synthetic origin, i.e. from non-plant and non-renewable raw materials. In the light of diminishing world oil reserves, the valorization of renewable materials to replace them has become a priority.

A need therefore exists to have available interconnected microcellular materials prepared from renewable raw materials as well as methods for the preparation of these materials, in particular the polyHIPE methods, which use renewable raw materials. It is also important to promote a sustainable development approach by valorizing industrial waste, without a negative impact on other priority uses of such resources, such as human or animal food, and without additional environmental impact.

SUMMARY OF THE INVENTION

The purpose of the invention is therefore to provide an interconnected microcellular material, preferably based on the polyHIPE method, while responding to certain sustainable development concerns and while retaining the advantageous properties of existing polyHIPE materials.

The present invention therefore relates to a method for the preparation of this interconnected microcellular material, using lignin as raw material. This raw material originates from lignocellulosic biomass.

Lignocellulosic biomass represents one of the most abundant renewable resources on earth. Lignin has particular significance in the light of its abundance and has been the subject of many research studies with a view to valorizing for purposes other than its current uses in timber and fuels.

In general terms, lignin results from the oxidative polymerization of at least three types of phenolic alcohols: p-coumarylic alcohol, coniferylic alcohol and sinapylic alcohol. However, its structure depends on the botanic origin, the age of the plant, the type of tissue, cells and parietal layers in which it is found. This high level of natural variation, combined with the variations arising from the methods of analysis makes presentation of the structure of the lignins difficult.

Thus, the term lignin is a generic name which designates a group of polyphenolic polymers having a high molecular mass, of variable and complex composition and structure.

In the chemical methods for the manufacture of paper pulp, the lignins are separated from the cellulose by chemical methods which significantly modify their structure. The residual lignins, then called "industrial lignins", are present in dissolved form in cooking liquors which can also comprise hemicellulose monomers. These cooking liquors are either strongly basic in the Kraft process, or in acid solutions comprising sulfonated derivatives in the case of the bisulfite method.

The industrial lignins can be extracted and constitute a by-product representing a significant quantity of waste of more than 50,000 tonnes annually worldwide.

Several types of industrial lignin are available and can be used in the context of the invention, for example:

Kraft lignin which originates from the paper-making process of the same name and represents more than 80% of paper production worldwide;
  lignosulfonates originating from the bisulfite method;
  organosols lignins resulting from a method of extraction using organic oxidants;
  lignins originating from biorefineries using sources of biomass other than wood for the preparation of biofuel such as ethanol.

In particular, the raw material of the method according to the invention is one of the main by-products of the paper industry, currently available in very large quantities and valorized to a very small extent, namely "black liquor".

Black liquor, also known as Kraft black liquor, is the cooking liquor originating from the manufacture of paper according to the Kraft process. It is presented in the form of a highly basic aqueous solution composed mainly of Kraft lignin residues and hemicellulose dissolved from paper pulp, as well as other inorganic chemical compounds used in the dissolution method. The black liquor is mainly used locally as a liquid fuel for supplying energy to the paper mills.

The invention therefore relates to a method for the preparation of an interconnected microcellular material by polymerization of a concentrated emulsion comprising:

an external dispersion phase comprising, in a solvent, a surfactant and a solution comprising at least one polymerizable monomer contained in industrial lignin, and an internal dispersed phase comprising a solvent that is immiscible with said polymerizable monomer and/or with the solvent of the external dispersion phase.

By "at least one polymerizable monomer contained in industrial lignin" is meant a polymerizable monomer which originates from the industrial lignins as defined previously.

Once the external dispersion phase of the concentrated emulsion is polymerized until a solid material is obtained, the latter is, preferably, subjected to one or more washing and drying step(s).

A subject of the invention is also interconnected microcellular materials, obtainable by the polymerization of a concentrated emulsion as described above.

In particular, the volume percent of the internal dispersed phase of the concentrated emulsion is greater than or equal to approximately 55%. Thus, the microcellular materials having an interconnected porous structure according to the invention are obtainable by polymerization of a concentrated emulsion comprising an internal dispersed phase volume percent lower than the theoretical threshold of 74% of the polyHIPE emulsions.

The concentrated emulsion according to the invention is, preferably, an emulsion of "oil-in-water" type i.e. having an aqueous phase for external dispersion phase and an organic phase for internal dispersed phase.

The external dispersion phase comprises a solution containing the monomers contained in the industrial lignin, as described above, which will then polymerize. This solution can be a cooking liquor, in particular the black liquor itself. In fact, Kraft lignin is the main constituent of the black liquor, which allows its preferred use as the main constituent of the external dispersion phase of a concentrated emulsion of oil-in-water type according to the invention, and this without prior modification. In the case where the solution containing the monomers contained in the industrial lignin is a cooking liquor, in particular the black liquor, the solvent of the external dispersion phase originates from this liquor.

In particular, the raw material used within the context of the invention is the black liquor comprising in particular from approximately 20% to approximately 80% by mass of dry matter, preferably from approximately 40% to approximately 60% by mass of dry matter. The preferred mass percent for obtaining interconnected microcellular materials according to the invention is 45% by mass of dry matter in the black liquor.

The internal dispersed phase of the emulsion according to the invention can be formed by any oil, and, in particular, an oil which is soluble in common solvents and is inexpensive in order to facilitate washing the solids. Other types of oil can be used as internal dispersed phase of the emulsion according to the invention. Thus, oils having a melting point between approximately 10° C. and approximately 40° C. and preferably close to ambient temperature can also be used.

When black liquor is used, the monomers capable of polymerizing originate from Kraft lignin and the hemicelluloses.

The polymerizable monomers contained in the external dispersion phase can be cross-linked in order to obtain a rigid solid. The external phase of the concentrated emulsion can then comprise, moreover, a cross-linking agent, such as, for example, epichlorhydrin and cyanuryl chloride.

Cross-linking allows the creation of covalent bonds between the polymer chains using the reactive chemical functions present on the lignin chains (aliphatic alcohols and phenols) as well as on the hemicellulose chains which are optionally present (aliphatic alcohols only), in an aqueous basic medium and at a moderate temperature. Under these conditions, the preferred cross-linking agent is epichlorhydrin. The reaction of epichlorhydrin with the Kraft lignin of the black liquor has the advantage of being catalyzed in a highly basic medium at a moderate temperature of 60° C.

According to the invention, the concentrated emulsion can be polymerized at a temperature below 100° C. and preferably from approximately 40° C. to approximately 80° C.

In order to form a stable oil-in-water emulsion, a surfactant having a highly hydrophilic character is, preferably, added to the external dispersion phase. The surfactant can thus be chosen from the anionic hydrophilic surfactants and the non-ionic hydrophilic surfactants.

For example, an anionic surfactant will be used, the hydrophilic head can be constituted by a carboxylate, sulfate or sulfonate group. The apolar part can be constituted by a long linear or branched, simple or functionalized alkyl chain, or a long linear or branched alkylbenzene chain. Thus, sodium dodecyl sulfate (SDS), triethanolamine stearate, sodium lauryl sulfate and triethanolamine lauryl sulfate can be, for example, used in order to form the emulsion according to the invention.

Preferentially, SDS is used as it is inexpensive and can be used in a wide variety of formulations.

According to the invention, the surfactant can be also chosen from non-ionic surfactants. A wide variety of surfactants with a high HLB (Hydrophilic-Lipophilic Balance) can be envisaged, comprising alkyl polyethoxylates, ethoxylated alkylphenols, the polymer complexes of polyethylene oxide and polypropylene oxide, polyethylene oxide octylphenols, polyethylene oxide nonylphenols, polyethylene oxide and polypropylene oxide block copolymers, sorbitan fatty acid monoesters and polyesters, glycerol fatty acids monoesters and polyesters, and mixtures thereof.

The porous morphology of the interconnected microcellular materials according to the invention can be characterized by the porosity but also by the distribution of the mean diameters of the cells, the mean diameter of the windows of the interconnections or also the specific surface area. Analysis of this porous morphology also comprises the determination of the origin of the porosity which originates from the fingerprint of the internal dispersed phase or also from the elimination of the water optionally contained in the external dispersion phase.

An indicator of the dispersion of the distribution of the diameters of the U cells can in particular be used for determining whether this distribution is polydisperse or also monodisperse. This factor U is defined by the following expression:

$$U = (1/d^*) \times (\Sigma |d^* - d_i| \times n_i d_i^3 / \Sigma n_i d_i^3)$$

where $n_i$ is the number of cells of diameter $d_i$ and $d^*$ the median diameter, namely the diameter for which the volume fraction of the smaller sizes is equal to 0.5. It is generally considered that a monodisperse distribution is obtained (i.e. where the diameters of the cells are homogeneous) when U is less than or equal to 0.3.

This porous morphology can be, in particular, adjusted as a function of the nature and the quantity of surfactant or also of the emulsification time. The interconnected microcellular material according to the invention then has a polydisperse or monodisperse distribution.

In order to determine the parameters influencing the porous morphology, different analysis techniques are used. Scanning Electron Microscopy (SEM) makes it possible to establish, from microphotographs, a statistical analysis of the mean diameter of the cells of the material. For its part, mercury intrusion porosimetry makes it possible to determine the porosity of the solid, the mean diameter of the interconnections as well as the apparent density of the final solid. Finally, measurement of the specific surface area of the interconnected microcellular materials is carried out by nitrogen adsorption and processing the data by the BET method (Brunauer-Emmet-Teller).

Adjustment of the experimental parameters thus makes it possible to obtain interconnected microcellular materials according to the invention having a more or less wide cell diameter distribution (monodisperse or polydisperse).

The invention also relates to the interconnected microcellular materials, obtainable by the method described previously.

These interconnected microcellular materials can in particular have a porosity greater than or equal to approximately 60%. This porosity value is sufficient in order to obtain materials with a high permeability while retaining the mechanical strength necessary for the applications envisaged.

The invention also relates to the use of a concentrated emulsion comprising at least one polymerizable monomer contained in industrial lignin, as defined previously, for the preparation of an interconnected microcellular material. The industrial lignin as described above can, in particular, be present in a cooking liquor, in particular the black liquor.

The invention also relates to an emulsion which is useful for the preparation of a microcellular material as defined above. This emulsion is preferably monodisperse.

The emulsion according to the invention comprises:
an external dispersion phase comprising, in a solvent, a surfactant and a solution comprising at least one polymerizable monomer contained in industrial lignin, and
an internal dispersed phase comprising a solvent that is immiscible with said monomer and/or with the solvent of the external dispersion phase.

Moreover, the invention relates to any article constituted by all or part of the interconnected microcellular material described above such as, for example, a filter, a thermal insulation article, an acoustic insulation article, an electrical or mechanical insulation article, a disposable absorbent article, or a support for inks, colorants and catalysts.

BRIEF DESCRIPTION OF THE FIGURES

FIG. 1 shows the image obtained for the interconnected microcellular material A based on 4% by mass of Triton X-405;

FIG. 2 shows the image obtained of the interconnected microcellular material C based on 4% by mass of Cremophor EL.

DETAILED DESCRIPTION OF THE INVENTION

The present invention is illustrated by the examples described hereafter, to which it is however not limited.

Example 1 relates to the preparation of concentrated emulsions based on black liquor.

Example 2 describes the preparation of interconnected microcellular materials by the polymerization of the external dispersion phase of the emulsions prepared in Example 1.

Example 3 relates to the analysis of the porous morphology of the microcellular materials obtained in Example 2 in particular as a function of the nature and the quantity of the surfactant.

Example 4 relates to the analysis of the porous morphology of microcellular materials obtained in Example 2 as a function of the emulsification time.

Example 1

Preparation of Concentrated Emulsions Based on Black Liquor

The emulsification is carried out using a system constituted by a metal tube of 10 mm in diameter divided into two chambers connected by a channel with a small diameter (1 mm), and closed at both ends by sealed pistons. The tube is fixed to a bench. A regular to-and-fro movement is applied to the pistons which close the tube by a crank and connecting rod system driven by a motor. The mixture to be emulsified is thus forced to pass alternatively from one chamber to the other through the small connecting channel. This creates high shearing of the mixture to be emulsified which promotes the obtaining of monodisperse emulsions.

The following are introduced into the metal tube constituting the mixing chamber of the emulsifier system:
the black liquor the dry matter content of which is known (Smurfit Kappa Cellulose from Pine),
the surfactant: Triton® X-405 (polyoxoethylene (35)-octylphenyl ether, HLB=17.0) (Sigma Aldrich) or Cremophor® EL (polyethoxylated castor oil (35), HLB=16-18) (Sigma Aldrich),
the cross-linking agent: epichlorhydrin (Acros Organics), and
castor oil (Acros Organics) as solvent of the internal dispersed phase.

The metal tube is closed using the two pistons and fixed onto the bench using screws. The mixture to be emulsified is then agitated by the alternating movement of the pistons for 80 min at a constant speed of 15 rpm.

φ is defined as being the approximate volume percent of the internal dispersed phase in the emulsion.

Four types of emulsion are produced using this protocol. The results are given in Table 1 below.

TABLE 1

| | Reference of the emulsion | | | |
|---|---|---|---|---|
| | A | B | C | D |
| Surfactant | Triton X-405 | | Cremophor EL | |
| Mass of black liquor (g) | 20 | 20 | 20 | 20 |
| Mass of surfactant (g) | 1 | 2 | 1 | 2 |
| Mass of epichlorhydrin (g) | 2.2 | 2.2 | 2.2 | 2.2 |
| Mass of castor oil (g) | 20 | 20 | 20 | 20 |
| φ (%) | 55 | 55 | 55 | 55 |

Example 2

Preparation of Microcellular Materials

The emulsions of Example 1 are moulded in moulds made of polytetrafluoroethylene (PTFE) with dimensions 2.80 cm×4.30 cm which are sealed and are heated to a temperature of 60° C. for 48 h. The rigid solids obtained after this step are placed with their mould in a bath of ethanol at ambient temperature for 24 h. During this period, part of the castor oil constituting the dispersed phase of the emulsion and part of the water of the external dispersion phase are swept by the ethanol. This results in a slight contraction of the solid which allows easy removal from the mould and without the risk of deterioration of the solid. Once removed from the mould, the solids are placed in a Soxhlet extractor and continuously extracted with ethanol for four days in order to totally eliminate the castor oil remaining in the solid. Once washed, the solids are placed in a bath of ether for 24 h at ambient temperature in order to replace the ethanol contained in the solid with this more volatile solvent. Finally, the solids are dried in ambient air for four days.

Example 3

Analysis of the Porous Morphology of the Microcellular Materials

Analysis by mercury intrusion porosimetry of the interconnected microcellular materials obtained according to Example 2 is carried out. The results are shown in Table 2 below. This analysis allows the porosity of the materials obtained to be determined, as well as the mean diameter of the interconnections or "windows".

SEM images of the materials prepared are produced. Thus, FIG. 1 corresponds to the image obtained for the interconnected microcellular material A based on 4% by mass of Triton X-405. FIG. 2 corresponds to the image obtained of the interconnected microcellular material C based on 4% by mass of Cremophor EL.

Analysis of the images of the interconnected microcellular materials obtained according to Example 2, complemented by a statistical analysis on a significant sample of cells (between 100 and 150 cells) is also carried out. This study makes it possible to determine the mean diameter of the cells, as well as the dispersion factor of these diameters U. The results obtained are shown in Table 2 below.

Analysis by nitrogen adsorption followed by processing the data according to the BET method makes it possible to access the specific surface areas of the microcellular materials prepared. The results are also shown in Table 2 below.

TABLE 2

| | Reference of the microcellular material | | | |
|---|---|---|---|---|
| | A | B | C | D |
| Surfactant | Triton ® X-405 | | Cremophor ® EL | |
| Mass percent of surfactant(*) | 4 | 8 | 4 | 8 |
| Porosity (%) | 68 ± 1 | 69 ± 2 | 67 ± 3 | 70 ± 1 |
| BET specific surface area ($m^2 \cdot g^{-1}$) | 82 ± 5 | 93 ± 5 | 110 ± 8 | 153 ± 10 |
| Mean diameter of cells (μm) | 6 | 11 | 9 | 16 |
| Dispersion factor U | 0.3 | 0.9 | 0.3 | 0.5 |
| Mean diameter of the interconnecting windows (nm) | 250 ± 20 | 300 ± 30 | 800 ± 160 | 850 ± 170 |

(*)Relative to the total mass of external dispersion phase

The results show that the nature of the surfactant as well as its quantity have little influence on the porosity measured. This is greater than the volume percent of dispersed phase, $\phi=55\%$ for all of the samples. This phenomena can be attributed to the presence of water in the black liquor constituting the external aqueous dispersion phase of the emulsion. The elimination of this water during the treatment of the interconnected microcellular materials contributes to the porosity. Thus, from 10 to 15% of the porosity of the samples can be attributed to the initial presence of this water.

The nature of the surfactant has an influence on the mean diameter of the interconnections. This is 300 nm for the microcellular materials A and B, Triton® X-405, and 800 nm for the microcellular materials C and D, Cremophor® EL.

The nature and the proportion of surfactant also have an influence on the mean diameter of the cells and the dispersion of the values of these diameters. The mean diameter of the cells is therefore 6 pm and the distribution is monodisperse for the Triton® X-405, 4% and 11 pm and the distribution is polydisperse for the Triton® X-405, 8%. Similarly, the mean diameter of the cells is 9 μm and the monodisperse distribution for the Cremophor® EL 4%; and 16 μm and the polydisperse distribution for the Cremophor® EL 8%.

Example 4

Influence of the Emulsification Time

Two other emulsions, E and F, were prepared according to the same formulation as that for emulsion C of Example 1, with variable emulsification times.

The results are as follows:

TABLE 3

| | Reference of the microcellular material | | |
|---|---|---|---|
| | C | E | F |
| Surfactant | Cremophor ® EL | | |
| Emulsification time (min) | 80 | 40 | 20 |
| Mass percent of surfactant(*) | 4 | 4 | 4 |
| Porosity (%) | 67 ± 3 | 72 ± 2 | 74 ± 2 |
| Mean diameter of cells (μm) | 9 | 8 | 4.5 |
| Dispersion factor U | 0.3 | 0.4 | 0.5 |
| Mean diameter of the interconnecting windows (nm) | 800 ± 160 | 900 ± 130 | 960 ± 100 |

(*)Relative to the total mass of the external dispersion phase

The results show that the emulsification time has a significant influence on the morphology of the microcellular material obtained.

For the same surfactant, Cremophor® EL, used in the same 4% proportion, the reduction in the emulsification time leads to a reduction in the mean diameter of the cells as well as a wider dispersion of these values (U increases).

The invention claimed is:

1. A method for preparing an interconnected microcellular material, comprising polymerizing a concentrated emulsion, said concentrated emulsion comprising:
   an external dispersion phase comprising a mixture of a surfactant and a solution comprising a solvent and at least one polymerizable monomer contained in industrial lignin dissolved in said solvent, said surfactant being in said solvent, and
   an internal dispersed phase comprising a solvent that is immiscible with said polymerizable monomer and/or with the solvent of the external dispersion phase.

2. The method according to claim 1, wherein the volume percent of the internal dispersed phase of the concentrated emulsion is greater than or equal to approximately 55%.

3. The method according to claim 1, wherein said external dispersion phase is an aqueous phase and wherein said immiscible solvent is an oil having a melting point between approximately 10° C. and approximately 40° C.

4. The method according to claim 1, wherein the industrial lignin is selected from the group consisting of Kraft lignin, lignosulfonates, organosols lignins and lignins originating from biorefineries.

5. The method according to claim 1, wherein the solution comprising at least one polymerizable monomer contained in industrial lignin further comprises at least one hemicellulose monomer dissolved in said solvent.

6. The method according to claim 1, wherein the solution comprising at least one polymerizable monomer contained in industrial lignin is a cooking liquor.

7. The method according to claim 6, wherein said cooking liquor is a black liquor that comprises from approximately 20% to approximately 80% by mass of dry matter.

8. The method according to claim 1, wherein said mixture of said external dispersion phase further comprises a cross-linking agent.

9. The method according to claim 1, wherein the emulsion is polymerized at a temperature below 100° C.

10. The method according to claim 1, wherein the surfactant is an anionic hydrophilic surfactant or a non-ionic hydrophilic surfactant.

11. The method according to claim 10, wherein the anionic hydrophilic surfactant is selected by the group consisting of sodium dodecyl sulfate, triethanolamine stearate, sodium lauryl sulfate and triethanolamine lauryl sulfate.

12. The method according to claim 10, wherein the non-ionic hydrophilic surfactant is selected from the group consisting of alkyl polyethoxylate, ethoxylated alkylphenol, polymer complexes of polyethylene oxide and polypropylene oxide, polyethylene oxide octylphenol, polyethylene oxide nonylphenol, polyethylene oxide and polypropylene oxide block copolymers, sorbitan fatty acid monoester and polyester, glycerol fatty acid monoester and polyester, and mixtures thereof.

13. The method according to claim 1, further comprising at least one step of washing and drying material formed by said polymerizing of the concentrated emulsion.

14. An interconnected microcellular material formed by the method according to claim 1.

15. The interconnected microcellular material according to claim 14, wherein said material has a porosity greater than or equal to approximately 60%.

16. The interconnected microcellular material according to claim 14, wherein cells of the interconnected microcellular material have a diameter from approximately 2 μm to approximately 50 μm.

17. The interconnected microcellular material according to claim 14, wherein interconnecting windows of the interconnected microcellular material have a diameter from approximately 50 nm to approximately 1000 nm.

18. A method for preparing an interconnected microcellular material comprising polymerizing a concentrated emulsion comprising at least one polymerizable monomer contained in industrial lignin.

19. The method according to claim 18, wherein the industrial lignin is selected from the group consisting of Kraft lignin, lignosulfonates, organosols lignins, lignins originating from biorefineries.

20. The method according to claim 18, wherein the industrial lignin is present in a cooking liquor.

21. An emulsion which is useful for the preparation of an interconnected microcellular material, comprising:
   an external dispersion phase comprising a mixture of a surfactant and a solution comprising a solvent and at least one polymerizable monomer contained in industrial lignin dissolved in said solvent, said surfactant being in said solvent, and
   an internal dispersed phase comprising a solvent that is immiscible with said polymerizable monomer and/or with the solvent of the external dispersion phase.

22. An article comprising the interconnected microcellular material according to claim 14.

23. The article according to claim 22, wherein said article is selected from the group consisting of a filter, a thermal insulation article, an acoustic insulation article, an electrical or mechanical insulation article, a disposable absorbent article, and a support for inks, colorants and catalysts.

* * * * *